Patented Dec. 30, 1952

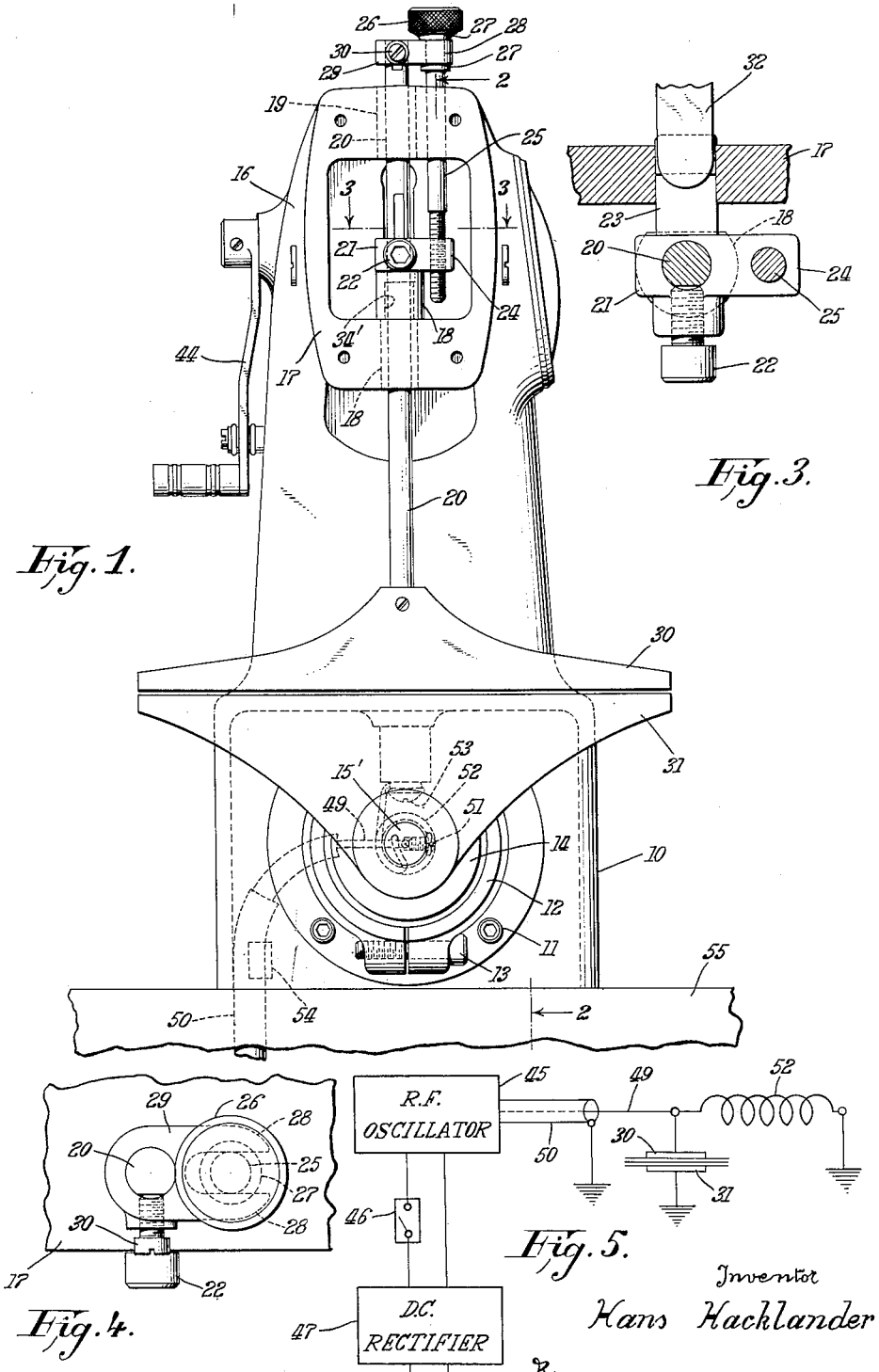

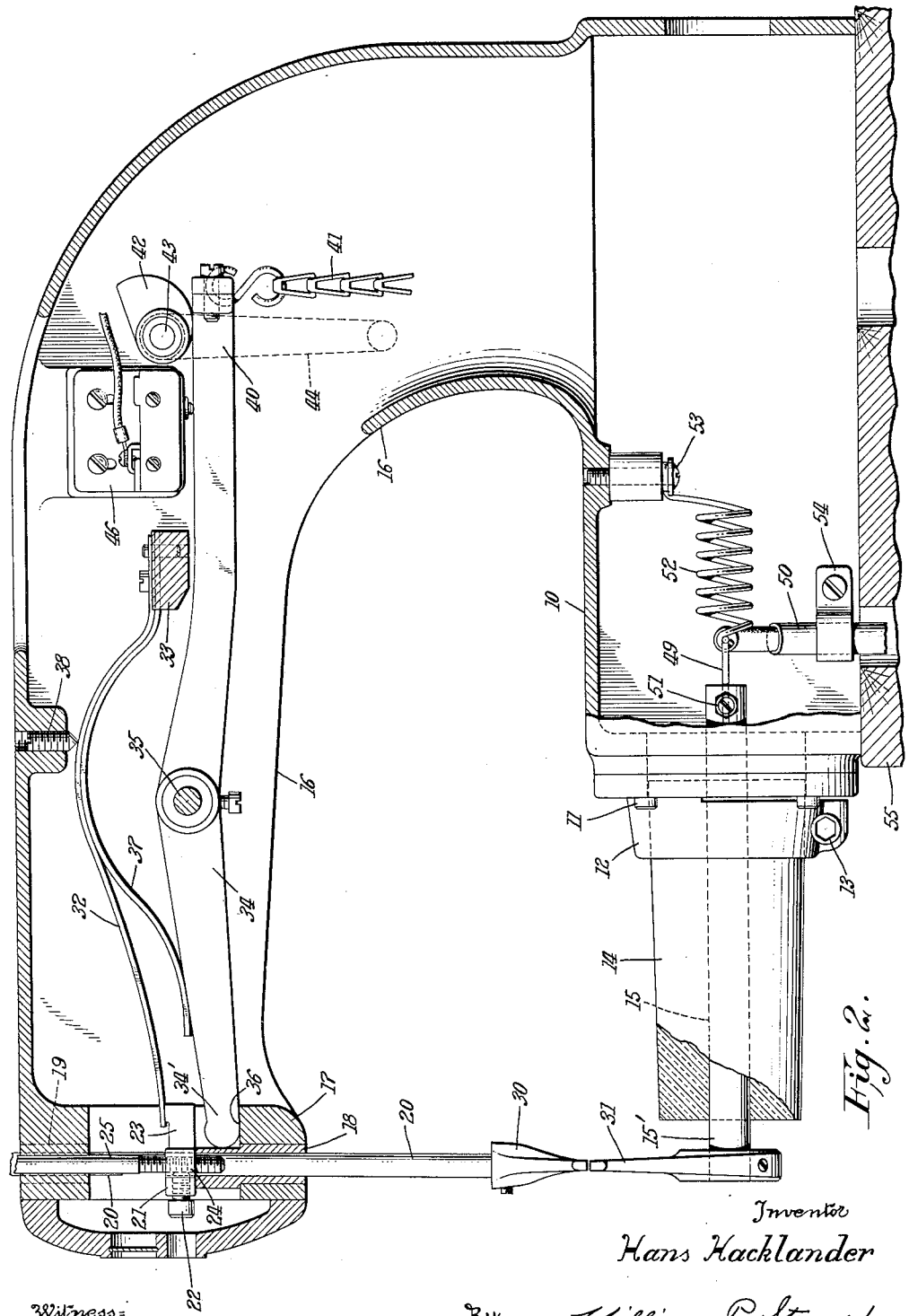

2,623,985

UNITED STATES PATENT OFFICE 2,623,985

ELECTRONIC BONDING MACHINE

Hans Hacklander, Linden, N. J., assignor to The Singer Manufacturing Company, Elizabeth, N. J., a corporation of New Jersey Application November 7, 1947, Serial No. 784,725

2 Claims. (Cl. 219—47)

1

This invention relates to machines for bonding pieces of thermoplastic material together by the use of high frequency electric current. The union is effected by the employment of conduction electrodes located on opposite sides of the thermoplastic pieces and electrically connected to a source of alternating high frequency current. The high frequency field between the electrodes softens the contiguous faces of the thermoplastic material so that the union may be effected by pressure applied to the material by the electrodes.

This invention has for one of its objects the provision of a composite machine which is simple in construction, may be easily manufactured and has a work-arm of small dimensions extending outwardly from the base of the machine about which tubular articles may be formed. Another object of this invention is the provision of novel means for insulating and supporting the lower electrode from the metal base of the machine.

A further object of this invention is to provide novel means for switching on the current to the electrodes when the material is clamped therebetween and to switch off the current when the electrodes are moved apart. A still further object is to provide adjustable means for limiting the minimum distance between the electrodes during the bonding cycle thereby to prevent excessive extrusion of the material along the bonding line.

These and other features of the invention will best be understood from the following description taken in connection with the accompanying drawings, in which:

Fig. 1 is a left end elevation of a machine having my invention embodied therein.

Fig. 2 is a central vertical sectional view taken along the line 2—2 of Fig. 1.

Fig. 3 is a fragmentary sectional view taken along the line 3—3 of Fig. 1.

Fig. 4 is a top plan view of the electrode adjusting means located above the hollow head of the machine.

Fig. 5 is a schematic illustration of the circuit for transmitting high frequency electric current to the electrodes.

In the embodiment of the invention selected for illustration, my machine comprises an oblong rectangularly shaped hollow metal base 10 to one end of which is attached by the screws 11 a split clamp-ring 12. Supported by and clamped in the ring 12 by the screw 13 is a cylindrically shaped work-arm 14 made of insulating material which is moulded around a conductor bar 15

2 of circular cross section. The conductor bar 15 extends through the clamp-ring 12 and a suitable aperture in the base 10 so as to have one of its ends terminate within the confines of the hollow base 10.

Rising from the base 10 is a gooseneck or bracket-arm 16 terminating in a hollow head 17 which overhangs the free end of the work-arm 14. Journaled for endwise vertical movement in bearings 18 and 19 carried by the hollow head is an electrode carrying bar 20 having removably secured to its lower end an upper electrode 30 which cooperates with a lower electrode 31 removably secured to the free end 15' of the conductor bar 15. Adjustably secured by a screw 22 to the electrode bar 20 is a stop member 21 which is adapted to rest upon the top of the bearing bushing 18. The stop 21 is L-shaped (Fig. 3) having two laterally extending arms 23 and 24. The arm 24 is threaded to receive an adjusting screw 25 which extends through a suitable aperture in the head 17 and is formed with a knurled head 26 which is located above the head and in a position of easy access.

Immediately below the knurled head 26, the screw 25 is formed with spaced apart shoulders 27 and the space between the shoulders receives the bifurcated end 28 of an arm 29 which is secured to the upper end of the electrode bar 20 by the screw 30. The electrode bar 20 is biased downwardly by a bowed spring 32 having one end secured to a leg 33 formed on the frame within the hollow bracket-arm 16 and its free end overlying the arm 23 of the stop 21.

In order to raise the electrode bar 20 against the action of the spring 32, a lever 34 is pivoted to the frame of the machine by a pivot pin 35. One end of the lever 34 underlies the arm 23 and rests upon a ledge 36 formed in the hollow head 17. The end of the lever 34 is spaced from the lower face of the arm 23 to provide loss motion and is spring biased against the ledge 36 by a flat spring 37 which has its free end overlying the lever 34 and its other end secured to the lug 33. The pressure exerted upon the electrode bar 20 by the action of the spring 32 may be regulated by the adjusting screw 38. For the purpose of raising and lowering the electrode bar 20, the end 40 of the lever 34 may be connected by a chain 41 to a treadle (not shown) or the end 40 of the lever may be controlled by a cam 42 fixed to a stub shaft 43 journaled in and passing through the bracket-arm of the machine. To the end of the shaft extending outside the arm there is secured a hand lever 44 which may be turned to cause the end 40 of the lever to be raised and lowered.

It is well known that when thermoplastic materials are placed between spaced electrodes between which a radio or high frequency electric field is established the material is heated due to dielectric losses. In order to provide a high frequency field between the electrodes, I have employed a conventional high frequency electron tube oscillator 45 (Fig. 5) which is connected through a micro-switch 46 to a direct current rectifier 47 which is connected to the usual 110 volt A. C. circuit. The high frequency oscillator is connected to one end of a coaxial transmission line having an inner conductor 49 and an outer conductor 50. At the receiving end, the inner conductor 49 enters a suitable opening in the conductor bar 15 (Fig. 2) and is held therein by a screw 51. Also electrically connected to the inner conductor 49 is an inductance coil 52 which has its other end electrically connected to the frame of the machine by a screw 53. The inductance value of the coil 52 is such that the capacitive effect of the coaxial transmission line is balanced out. The outer conductor 50 of the transmission line is grounded to the frame of the machine by the strap 54. The switch 46 makes and breaks the circuit to the plates of the electronic tubes and this switch is carried on a boss formed on the frame of the machine and in a position to be actuated by the lever 34. As shown in Fig. 2 there is clearance between the end 34' of the lever 34 and the lower face of the arm 23, thereby providing loss motion between these members, and when the end 40 of the lever 34 is pushed down by the cam 42 or pulled down by the treadle connection the first movement of the lever 34 breaks the circuit between the rectifier 47 and the oscillator 45 thereby shutting off the current to the electrodes 30 and 31. Further movement of the lever raises the electrode 30 from the work so that it may be removed. Conversely, when the electrode 30 is lowered the material is clamped between the electrodes before the high frequency current is supplied to the electrodes. This arrangement of the parts prevents arcing between the electrodes and permits the operator, by applying a slight pressure to the treadle, to control the turning off and on of the current to the electrodes.

From the above, it will be understood that my improved machine is unitary and may be placed upon a table, indicated as at 55, with the arm 14 extending laterally from the base 10 and over the edge of the table thus forming a free work supporting arm which is free of obstructions. It will also be understood that the shape of the electrodes may be varied and that they may be arranged longitudinally as well as transversely of the arm 15.

Having thus set forth the nature of the invention, what I claim herein is:

1. An electronic bonding machine comprising a base, a circularly shaped work-arm of insulating material having one end removably clamped to said base and its other end extending outwardly from said base, a rigid electrical conductor bar embedded therein with its free end extending outwardly therefrom, a lower electrode removably secured to and supported by said conductor bar, an overhanging bracket-arm overlying said work-arm, a movable vertically disposed bar carried by said bracket-arm and having an electrode secured to its lower end, mechanism for raising and lowering said upper electrode, adjustable means for predetermining the lowest point to which said upper electrode may descend, and means under control of the mechanism for raising and lowering the upper electrode for establishing a high frequency field between said electrodes.

2. An electronic bonding machine comprising a base, a work supporting arm formed of an insulating material extending laterally from said base and terminating in a free end remote from said base, a conductor extending through said arm, an electrode connected to said conductor, a hollow bracket-arm overhanging said work supporting arm, a second electrode carried by said bracket-arm, spring means disposed within said bracket-arm for urging said second electrode towards said first electrode, means for supplying a high frequency electrical current to said electrodes, a lever having a lost motion connection with said second electrode for raising and lowering said electrode and a switch under control of said lever for interrupting the current supplied to said electrodes upon the initial movement of said lever when said second electrode is raised.

HANS HACKLANDER.

REFERENCES CITED

The following references are of record in the file of this patent:

UNITED STATES PATENTS

| Number | Name | Date |
| --- | --- | --- |
| 1,899,233 | Derby | Feb. 28, 1933 |
| 2,275,430 | Hart et al. | Mar. 10, 1942 |
| 2,324,068 | Crandell | July 13, 1943 |
| 2,401,991 | Walton et al. | June 11, 1946 |
| 2,432,412 | Hacklander | Dec. 9, 1947 |
| 2,458,059 | Christensen et al. | Jan. 4, 1949 |
| 2,473,143 | Graham et al. | June 14, 1949 |
| 2,522,823 | Hayes et al. | Sept. 19, 1950 |
| 2,539,375 | Snyder | Jan. 23, 1951 |